US011272164B1

(12) United States Patent
Xing et al.

(10) Patent No.: US 11,272,164 B1
(45) Date of Patent: Mar. 8, 2022

(54) DATA SYNTHESIS USING THREE-DIMENSIONAL MODELING

(71) Applicant: Amazon Technologies, Inc., Seattle, WA (US)

(72) Inventors: Yifan Xing, Bellevue, WA (US); Yuanjun Xiong, Seattle, WA (US); Wei Xia, Seattle, WA (US); Wei Li, Seattle, WA (US); Shuo Yang, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 16/746,313

(22) Filed: Jan. 17, 2020

(51) Int. Cl.
*H04N 13/275* (2018.01)
*G06T 7/73* (2017.01)
*G06N 20/00* (2019.01)
*G06T 15/50* (2011.01)

(52) U.S. Cl.
CPC .......... *H04N 13/275* (2018.05); *G06N 20/00* (2019.01); *G06T 7/73* (2017.01); *G06T 15/506* (2013.01)

(58) Field of Classification Search
CPC . G06T 11/00; G06T 2207/20081; G06T 7/11; G06T 15/04; G06T 11/60; G06T 7/97; G06T 2200/24; G06T 2207/30201; G06T 7/174; G06T 15/00; G06T 2200/04; G06T 2207/10012; G06T 2207/20228;
(Continued)

(56) References Cited

U.S. PATENT DOCUMENTS 5,644,651 A * 7/1997 Cox ................. G06K 9/209
345/419
5,850,469 A * 12/1998 Martin ................. G01S 5/163
382/154
(Continued)

FOREIGN PATENT DOCUMENTS

JP 2015038699 A * 2/2015

OTHER PUBLICATIONS

Bagdanov et al., "The Florence 2D/3D Hybrid Face Dataset," In Proceedings of Joint ACM Workshop on Human Gesture and Behavior Understanding, ACM, 2011, pp. 79-80.
(Continued)

*Primary Examiner* — Abderrahim Merouan
(74) *Attorney, Agent, or Firm* — Nicholson De Vos Webster & Elliott LLP

(57) ABSTRACT

Techniques for data synthesis for training datasets for machine learning applications are described. A first image of at least an object from a first viewpoint is obtained. The first image having associated first image metadata including a first location of a feature of the object in the first image. A model is generated from the first image, the model including a three-dimensional representation of the object. A second image is generated from the model, the second image including the object from a second viewpoint that is different from the first viewpoint. Second image metadata is generated, the second image metadata including a second location of the feature of the object in the second image, the second location corresponding to the first location adjusted for the difference between the second viewpoint and the first viewpoint.

20 Claims, 7 Drawing Sheets

(58) Field of Classification Search
CPC ........... G06K 9/00288; G06K 9/00221; G06K 9/00268; G06N 3/08; G06N 20/00
See application file for complete search history.

(56) References Cited

U.S. PATENT DOCUMENTS

| | | | | |
|---|---|---|---|---|
| 6,018,349 | A * | 1/2000 | Szeliski | G06T 3/0068 345/629 |
| 6,047,087 | A * | 4/2000 | Imaizumi | G06T 9/005 382/232 |
| 6,192,145 | B1 * | 2/2001 | Anandan | G06T 7/246 382/154 |
| 6,330,356 | B1 * | 12/2001 | Sundareswaran | G06T 3/00 345/648 |
| 6,522,787 | B1 * | 2/2003 | Kumar | G06T 15/10 348/E5.022 |
| 6,985,620 | B2 * | 1/2006 | Sawhney | G01S 5/163 345/419 |
| 9,233,470 | B1 * | 1/2016 | Bradski | B25J 9/1697 |
| 10,210,631 | B1 * | 2/2019 | Cinnamon | G06T 11/003 |
| 10,319,094 | B1 * | 6/2019 | Chen | G06F 3/0484 |
| 10,796,476 | B1 | 10/2020 | Xing et al. | |
| 2002/0080094 | A1 * | 6/2002 | Biocca | H04N 13/344 345/8 |
| 2002/0097197 | A1 * | 7/2002 | Togino | G02B 27/0172 345/8 |
| 2003/0146901 | A1 * | 8/2003 | Ryan | G06K 9/3233 345/158 |
| 2009/0290182 | A1 * | 11/2009 | Hashimoto | G03G 15/502 358/1.9 |
| 2011/0018863 | A1 * | 1/2011 | Ha | H04N 13/275 345/419 |
| 2011/0298799 | A1 * | 12/2011 | Mariani | G06K 9/6209 345/420 |
| 2015/0255844 | A1 * | 9/2015 | Liu | H01P 1/2002 333/134 |
| 2016/0171753 | A1 * | 6/2016 | Park | G06T 15/506 345/420 |
| 2016/0180441 | A1 * | 6/2016 | Hasan | G06Q 30/0643 705/26.7 |
| 2016/0261911 | A1 * | 9/2016 | Soundararajan | H04N 21/4223 |
| 2016/0284068 | A1 * | 9/2016 | Rouh | G06T 7/593 |
| 2017/0039006 | A1 * | 2/2017 | Saito | G06F 3/1213 |
| 2018/0253895 | A1 | 9/2018 | Arumugam | |
| 2019/0019014 | A1 | 1/2019 | Ye et al. | |
| 2019/0066369 | A1 | 2/2019 | Peng | |
| 2020/0035037 | A1 * | 1/2020 | Wang | G06T 7/13 |
| 2020/0042286 | A1 * | 2/2020 | Bui | G06F 9/451 |
| 2020/0342652 | A1 * | 10/2020 | Rowell | G06K 9/6256 |
| 2020/0360312 | A1 * | 11/2020 | Hall | G16H 20/10 |
| 2021/0049828 | A1 * | 2/2021 | Park | G06T 17/00 |

OTHER PUBLICATIONS

Beeler et al., "High-Quality Passive Facial Performance Capture Using Anchor Frames," ACM Transactions on Graphics, vol. 30, No. 4, Article 75, Jul. 2011, p. 75:1-75:10.

Blanz et al., "A Morphable Model for the Synthesis of 3D Faces," in Proceedings of the Annual Conference on Computer Graphics and Interactive Techniques, ACM Press/Addison-Wesley Publishing Co., 1999, pp. 187-194.

Bulat et al., "How Far Are We From Solving the 2D & 3D Face Alignment Problem? (and a dataset of 230,000 3D facial landmarks)," in Proceedings of the International Conference on Computer Vision (ICCV), vol. 1, 2017, 14 pages.

Cao et al., "FaceWarehouse: A 3D Facial Expression Database for Visual Computing," IEEE Transactions on Visualization and Computer Graphics, vol. 20, No. 3, 2014, pp. 1-11.

Chang et al., "ExpNet: Landmark-Free, Deep, 3D Facial Expressions," 2018 13th IEEE International Conference on Automatic Face and Gesture Recognition (FG 2018), 2018, pp. 122-129.

Chen et al., "NEIL: Extracting Visual Knowledge From Web Data," in Proceedings of the International Conference on Computer Vision (ICCV), 2013, pp. 1409-1416.

Choy et al., "3D-R2N2: A Unified Approach for Single and Multi-View 3D Object Reconstruction," in Proceedings of the European Conference on Computer Vision (ECCV), Springer, 2016, pp. 628-644.

Huang et al., "Labeled Faces in the Wild: A Database for Studying Face Recognition in Unconstrained Environments," in Workshop on Faces in 'Real-Life' Images: Detection, Alignment, and Recognition, Sep. 2008, 15 pages.

Huber et al., "A Multiresolution 3D Morphable Face Model and Fitting Framework," in Proceedings of the 11th International Joint Conference on Computer Vision, Imaging and Computer Graphics Theory and Applications, 2016, 8 pages.

Jackson et al., "Large Pose 3D Face Reconstruction From a Single Image via Direct Volumetric CNN Regression," in Proceedings of the International Conference on Computer Vision (ICCV), 2017, pp. 1031-1039.

Jiang et al., "3D Face Reconstruction with Geometry Details from a Single Image," IEEE Transactions on Image Processing, vol. 27, No. 10, 2018, pp. 4756-4770.

Jourabloo et al., "Large-Pose Face Alignment via CNN-Based Dense 3D Model Fitting," in Proceedings of the Conference on Computer Vision and Pattern Recognition (CVPR), 2016, pp. 4188-4196.

Kemelmacher-Shlizerman et al., "Face Reconstruction in the Wild," in Proceedings of the International Conference on Computer Vision (ICCV), 2011, pp. 1746-1753.

Kemelmacher-Shlizerman, Ira, "Internet Based Morphable Model," in Proceeding of the International Conference on Computer Vision (ICCV), 2013, pp. 3256-3263.

Kim et al., "InverseFaceNet: Deep Single-Shot Inverse Face Rendering From a Single Image," ArXiv prepring arXiv: 1703.10956, 2017, 10 pages.

Kingma et al., "Adam: A Method for Stochastic Optimization," ICLR 2015, 2015, pp. 1-9.

Koestinger et al., "Annotated Facial Landmarks in the Wild: A Large-Scale, Real-World Database for Facial Landmark Localization," in Proceedings of the International Conference on Computer Vision Workshops, 2011, pp. 2144-2151.

Laine et al., "Temporal Ensembling for Semi-Supervised Learning," ArXiv preprint arXiv: 1610.02242, Oct. 2016, 8 pages.

Li et al., "Learning Without Forgetting," IEEE Transactions on Pattern Analysis and Machine Intelligence, Feb. 2017, 13 pages.

Li et al., "Optimol: Automatic Online Picture Collection via Incremental Model Learning," Int. Journal of Computer Vision, vol. 88, No. 2, Jul. 2009, pp. 147-168.

Lorensen et al., "Marching Cubes: A High Resolution 3D Surface Construction Algorithm," SIGGRAPH Computer Graphics, vol. 21, No. 4, Jul. 1987, pp. 163-169.

Notice of Allowance, U.S. Appl. No. 16/119,514, dated Feb. 18, 2020, 8 pages.

Notice of Allowance, U.S. Appl. No. 16/119,514, dated Jun. 4, 2020, 5 pages.

Piotraschke et al., "Automated 3D Face Reconstruction From Multiple Images Using Quality Measures," in Proceedings of the Conference on Computer Vision and Pattern Recognition (CVPR), 2016, pp. 3418-3427.

Radosavovic et al., "Data Distillation: Towards Omni-Supervised Learning," ArXiv preprint arXiv:1610.02242, 2016, 10 pages.

Richardson et al., "3D Face Reconstruction by Learning From Synthetic Data," in 3D Vision (3DV), 2016 Fourth International Conference on, 2016, pp. 460-469.

Richardson et al., "Learning Detailed Face Reconstruction from a Single Image," in Proceedings of the Conference on Computer Vision and Pattern Recognition (CVPR), 2017, pp. 5553-5562.

Romdhani et al., "Efficient, Robust and Accurate Fitting of a 3D Morphable Model," in Proceedings of the International Conference on Computer Vision (ICCV), IEEE, vol. 3, 2003, pp. 59-66.

Romdhani et al., "Estimating 3D Shape and Texture Using Pixel Intensity, Edges, Specular Highlights, Texture Constraints and a

(56) References Cited

OTHER PUBLICATIONS

Prior," in Proceedings of the Conference on Computer Vision and Pattern Recognition (CVPR), vol. 2, 2005, pp. 986-993.

Rosenberg et al., "Semi-Supervised Self-Training of Object Detection Models," in WACV/MOTION, 2005, pp. 29-36.

Roth et al., "Adaptive 3D Face Reconstruction From Unconstrained Photo Collections," in Proceedings of the Conference on Computer Vision and Pattern Recognition (CVPR), 2016, pp. 4197-4206.

Sagonas et al., "300 Faces in-the-Wild Challenge: The First Facial Landmark Localization Challenge," in Proceedings of the International Conference on Computer Vision Workshops, 2013, pp. 397-403.

Savran et al., "Bosphorus Database for 3D Face Analysis," in European Workshop on Biometrics and Identity Management, Springer, 2008, pp. 47-56.

Suwajanakorn et al., "Total Moving Face Reconstruction," in Proceedings of the European Conference on Computer Vision (ECCV), Springer, 2014, pp. 796-812.

Tewari et al., "Mofa: Model-Based Deep Convolutional Face Autoencoder for Unsupervised Monocular Reconstruction," in The IEEE International Conference on Computer Vision (ICCV), vol. 2, 2017, 13 pages.

Tewari et al., "Self-Supervised Multi-Level Face Model Learning for Monocular Reconstruction at over 250 Hz," ArXiv preprint arXiv:1712.02859, vol. 2, 2017, 17 pages.

Thies et al., "Face2Face: Real-Time Face Capture and Reenactment of RGB Videos," in Proceedings of the Conference on Computer Vision and Pattern Recognition (CVPR), 2016, pp. 2387-2395.

Tran et al., "Regressing Robust and Discriminative 3D Morphable Models with a Very Deep Neural Network," in Proceedings of the Conference on Computer Vision and Pattern Recognition (CVPR), 2017, pp. 1493-1502.

Valgaerts et al., "Lightweight Binocular Facial Performance Capture Under Uncontrolled Lighting," ACM Trans. Graph., vol. 31, No. 6, 2012, 11 pages.

Zhang et al., "A High-Resolution Spontaneous 3D Dynamic Facial Expression Database", 2013 10th IEEE International Conference and Workshops on Automatic Face and Gesture Recognition (FG), 2013, pp. 1-6.

Zhu et al., "Face Alignment Across Large Poses: A 3D Solution," in Proceedings of the Conference on Computer Vision and Pattern Recognition (CVPR), 2016, pp. 146-155.

\* cited by examiner

DATA SYNTHESIS USING THREE-DIMENSIONAL MODELING

BACKGROUND

Modern approaches to machine vision tasks such as object detection and object recognition often use models trained using machine learning techniques (e.g., supervised learning, reinforcement learning, etc.). Development of such models often requires large datasets of example images for training. Robust training datasets are often required in order to achieve good model performance. Robust datasets include an abundance of high-quality images displaying a variety of objects under different angles, lighting conditions, etc.

BRIEF DESCRIPTION OF DRAWINGS

Various embodiments in accordance with the present disclosure will be described with reference to the following drawings.

DETAILED DESCRIPTION

Figure 1:
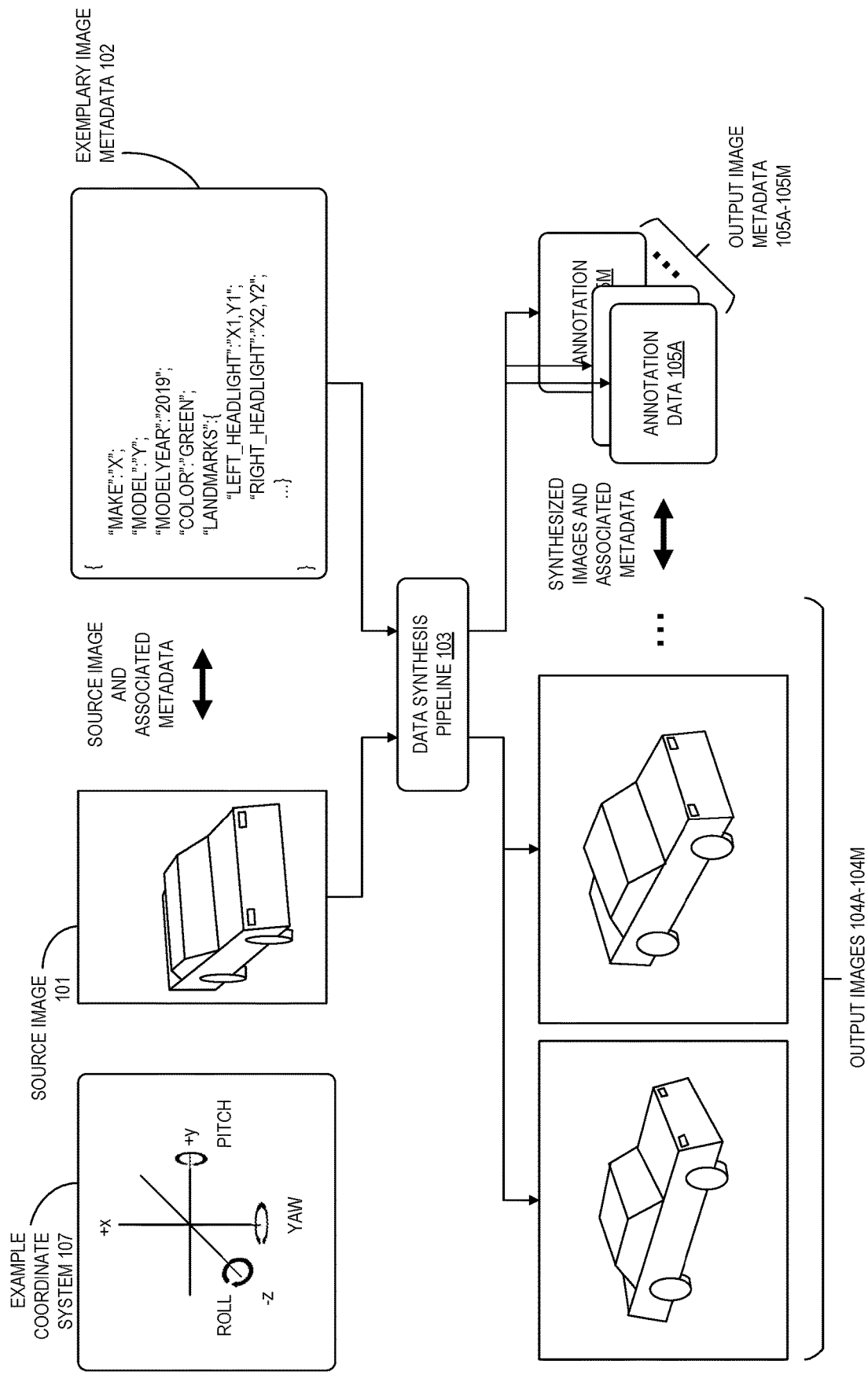
FIG. 1 is a block diagram illustrating data synthesis using three-dimensional (3D) object modeling according to some embodiments.

The present disclosure relates to methods, apparatus, systems, and non-transitory computer-readable storage media for data synthesis using three-dimensional object modeling. Many modern techniques for vision-based tasks such as object detection and object identification rely on machine learning models that "learn" from examples in a training dataset. For example, a model might learn to discriminate between deciduous and coniferous trees by training with images of those types of trees. Once trained, the model can be deployed to process new images to discriminate between those kinds of trees. However, model performance can suffer when new images present trees under conditions not reflected in the training dataset. For example, if the training dataset generally reflected tree profiles taken under midday lighting conditions, a new image of a deciduous tree from an aerial view at dusk might be mis-classified as a coniferous tree. Accordingly, a robust training dataset is a critical enabler for building higher performing models.

Robust image datasets for training machine learning models are often characterized by a diversity of images in the training image dataset. Such datasets include images having a variety of different objects of interest viewed from many different viewpoints, under many different lighting conditions, and in many different environments. Additionally, images in the dataset must be annotated to reflect the contents of the image—in the tree example, an image of a coniferous tree might have a metadata tag that indicates the image depicts a "coniferous" tree type. Such annotations can be view-independent annotations (e.g., the type or class of the object) and view-dependent annotations (e.g., the locations of features of the object such as the top of a tree, the tree trunk, etc. within the image). As should be apparent, assembling and annotating a robust image dataset often having many thousands of images can entail significant costs—both in terms of monetary cost and human labor.

The data synthesis techniques disclosed herein can increase the diversity in a source image dataset. According to some embodiments, images (sometimes referred to as a source image or source images) in an image dataset are used to generate a three-dimensional (3D) model of the object in the image. New images are generated from the 3D model by applying various transformations such as capturing the object from a new viewpoint, changing the lighting conditions, etc. Texture data from the original image can be preserved to retain photo-realistic quality of the source image in the new image(s). Annotation data associated with the image used to generate the 3D model is translated for the newly synthesized images. For example, view-independent annotations (also referred to herein as "static" annotations) such as object type can be added directly as annotations to the newly synthesized image(s)s, while view-dependent annotations (also referred to herein as "dynamic" annotations) are translated to reflect the new location of those features in the newly synthesized image(s). The disclosed data synthesis techniques dramatically reduce the cost of building a robust image training dataset. In addition to reducing costs of building robust datasets, datasets generated using the disclosed data synthesis techniques significantly improve the performance of various machine learning tasks.

FIG. 1 is a block diagram illustrating data synthesis using three-dimensional (3D) object modeling according to some embodiments. At a high level, a data synthesis pipeline 103 synthesizes one or more output images 104 from a source image 101 by creating a 3D model of an object in the source image 101. The data synthesis pipeline 103 can then generate new images from the 3D model, the new images having adjusted viewpoints, lighting conditions, etc.

The source image 101 has associated image metadata 102. Such metadata can include annotations (sometimes referred to as labels). As used herein, such annotations are generally treated as static or dynamic. Static annotations include information about the object that is independent of the object in the image—e.g., inherent characteristics about the object such as its type. Dynamic annotations include information that is dependent of the orientation of the object in the image (sometimes referred to as "landmarks"). In the illustrated example, the object in the source image 101 is a vehicle. The exemplary image metadata 102 includes several static and dynamic annotations. The static annotations include the make, model, model year, and color of the vehicle. The dynamic annotations or landmarks include locations of features of the vehicle in the image such as the position of the left headlight, the position of the right headlight, etc. In addition to synthesizing output images 104, the data synthesis pipeline calculates new dynamic annotation metadata for a given output image such as output image 104A based on the shift in viewpoints from the source image 101 to the output image 104A. The new dynamic annotations and the static annotations become the image metadata for the output image 104A.

An example coordinate system 107 illustrates certain terms used herein. As shown, rotation about the z axis is referred to as roll, rotation about the y axis is referred to as pitch, and rotation about the x axis is referred to as yaw. Numerous output images 104A-104M can be generated from a single source image 101. In the facial recognition context, for example, if a subject's face is oriented with the nose on the −z axis and ears on the +/−y axis, the subject moving his or her head up and down would correspond to changes in pitch while the subject moving her or her head from side to side would correspond to changes in yaw. If yaw is swept from −60 to 60 degrees in 10 degree steps, pitch is swept from −45 degrees to +45 degrees in 10 degree steps, and roll is swept from −15 degrees to 15 degrees in 10 degree steps, the single source image 101 can produce over 500 images (13×10×4). Of course, additional degrees of freedom such as viewpoint distance to the object model and illumination of the object model can further increase the number of output images 104.

Figure 2:
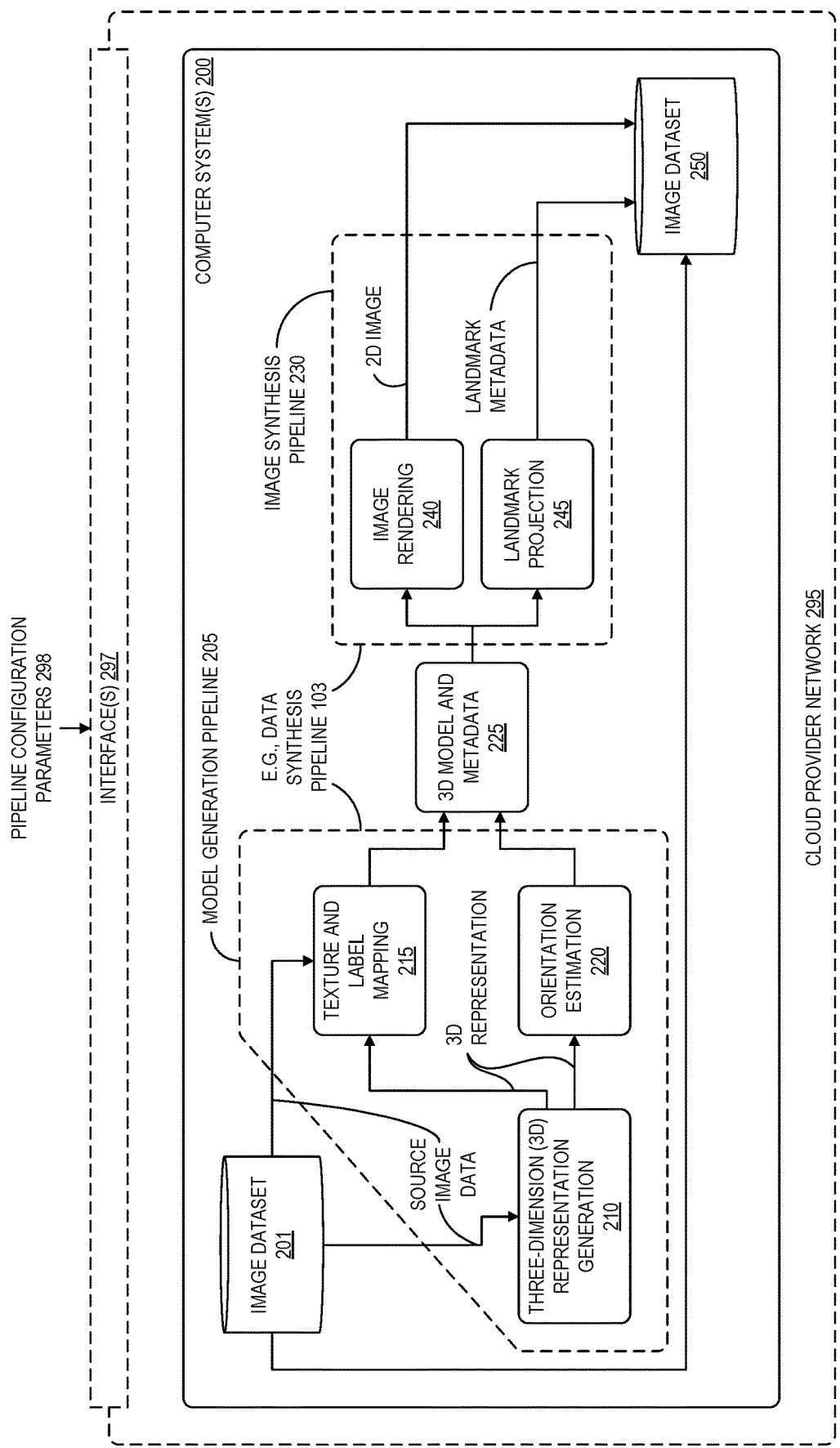
FIG. 2 is a block diagram illustrating an exemplary environment for data synthesis using 3D object modeling including a model generation pipeline and an image synthesis pipeline according to some embodiments.

FIG. 2 is a block diagram illustrating an exemplary environment for data synthesis using 3D object modeling. The illustrated environment includes a model generation pipeline 205 and an image synthesis pipeline 230. Together, the model generation pipeline 205 and the image synthesis pipeline 230 can form a data synthesis pipeline such as data synthesis pipeline 103. The model generation pipeline 205 receives the image data (e.g., both the image pixel data and image metadata) of a source image from an image dataset 201 and outputs a 3D model and associated metadata 225 for the source image. The image synthesis pipeline 230 receives 3D model and associated metadata 225 for a given source image and outputs one or more synthesized images, each synthesized image having associated metadata.

The model generation pipeline 205 includes a 3D representation generation 210 component, a texture and label mapping 215 component, and an orientation estimation 220 component. Additional details regarding model generation are provided below with reference to FIG. 3. At a high level, the 3D representation generation 210 component generates a 3D representation of an object depicted in the 2D source image. Various single image reconstruction techniques can be used. In some embodiments, deep learning techniques are used. For example, a neural network trained to identify the location of an object of interest in the source image can identify the portion of the source image that includes the object. Another neural network that generates a 3D occupancy volume can operate on the identified portion of the source image to generate the 3D occupancy volume of the object. A 3D occupancy volume is a data structure that can be considered M×N×P latticework of "spaces," each space having a binary indicator as to whether the volume represented by that space includes a portion of the model. Such a neural network is sometimes referred to as a volumetric regression network or VRN. The 3D representation generation 210 component can convert the 3D occupancy volume into another 3D representation for one or more of the downstream components of the pipeline 205. For example, the 3D representation generation 210 component can convert the occupancy volume into a mesh with vertices connected by edges.

The texture and label mapping 215 component receives the 3D representation from the 3D representation generation 210 component and performs two functions: texture mapping to texture the 3D model of the source image (including, optionally, background) and label mapping to locate the dynamic annotations having (x, y) coordinates in the source image to an (x, y, z) coordinate in the 3D model.

To texture a 3D model of the source image, the texture and label mapping 215 component "aligns" the 3D representation received from the 3D representation generation 210 component with the source image and performs ray tracing to map the red, green, blue (RGB) or other pixel values from the source image to the 3D model. For 3D representations generated using a camera centered coordinate system, texture mapping corresponds to mapping a vertex in the model with coordinates (x, y, z) to image coordinates (u, v), and finding pixel coordinates (x, y) with minimal distance to (u, v). For example, rays traced through pixels of the object in the source image will typically intersect with the 3D representation, and the RGB value of the pixel can be associated with nearest vertex (e.g., in a mesh data structure). Rays that do not intersect with the 3D representation are projected onto a background plane behind the 3D representation (in the +z direction). For example, if the 3D representation has a z-axis range from 0 to 500, a background plane can be positioned at z=501 with points corresponding to (x, y) coordinates of pixels that did not intersect with the 3D representation. Adding the background plane allows the background to be preserved later during image synthesis. Together, the textured 3D representation and background plane can form a 3D model that can be used for image synthesis.

In addition to texturing, the texture and label mapping 215 component updates metadata associated with the source image. In particular, the texture and label mapping 215 component maps dynamic annotations to the 3D model. Like texture mapping, ray tracing can be used to determine the (x, y, z) coordinate of dynamic annotations. The texture and label mapping 215 component can project a ray through the dynamic annotation (x, y) location in the source image and obtain the (x, y, z) coordinate of the dynamic annotation in the model space based on the intersection of the ray with the model.

The orientation estimation 220 component generates metadata that includes an estimated orientation of the object for a given source image. The orientation can be estimated from the 3D representation generation 210 component. One technique to estimate the orientation of the object relies on the relative bilateral symmetry often present in objects (e.g., trees, faces, vehicles, etc.). The bilateral symmetry property can be used to estimate the bilateral symmetry plane in the 3D representation, and the bilateral symmetry plane can be used to derive the orientation of an object. For example, for an object that is generally symmetric along an axis (e.g., a tree is often relatively symmetric along the axis defined by the trunk), multiple bilateral symmetry planes are possible. The intersection of those bilateral symmetry planes can be used to estimate the orientation of the trunk of the tree. In the facial recognition context, the orientation can be represented by the bilateral symmetry plane of the subject (e.g., dividing the face into left and right) and the gaze direction of the subject (e.g., as defined by the direction of the subject's nose). Estimation of the bilateral symmetry plane can be achieved by calculating the plane normal which corresponds to an eigenvector of the sample covariance matrix of the vertices in a mesh representation of a face. Because VRN reconstruction can produce "shallow" models akin to a mask rather than a full head, the other two eigenvectors of the covariance matrix correspond to the gaze direction and the "vertical" direction of the face, pointing towards the top of the subject's head.

The image synthesis pipeline 230 synthesizes new, annotated images. Inputs to the image synthesis pipeline 230 can include the 3D model, the estimated orientation metadata, and the dynamic annotations mapped into the 3D space of the model. As illustrated, the image synthesis pipeline 230 includes an image rendering 240 component and a landmark projection 245 component. Additional details regarding image synthesis are provided below with reference to FIG. 4.

In some embodiments, the image rendering 240 component generates new images by rendering the model from new viewpoints (e.g., either by rotating the model with respect to the original camera viewpoint or modifying the position of the "camera" for the new viewpoints). The position of the new viewpoints can be parameterized (e.g., by sweeping from −m degrees to +n degrees about one or more axis in certain step sizes). For example, the pitch may be constrained to the interval [−20,+20] avoid extreme top or bottom views of the object.

Various illumination models can be used to light the 3D model. In some embodiments, one or more light sources can be added for rendering, the light sources having customizable intensities. In some embodiments, an emissive illumination model can be used during image synthesis such that the material of each vertex has no reflectance component and rather behaves as a light source. Using an emissive illumination model removes self-reflectance and shadowing effects in a typical 3D model rendering process, easing the merging of the 3D representation of the object with the background plane.

Other transformations may be applied to the synthesized images. For facial recognition datasets, techniques such as expression modification can be used to further increase the diversity in a dataset. For example, the 3D model of a subject's face can be adjusted to exhibit various expressions such as neutral, sad, angry, happy, etc.

The landmark projection 245 component translates the label metadata from the (x, y, z) coordinates in the model space to the (x, y) coordinates of the synthesized image space given the new viewpoint for the synthesized image. Ray tracing can be used to determine the new (x, y) coordinate for a label given by tracing the path from the label's (x, y, z) model coordinate through the new camera viewpoint used for synthesizing the particular image.

Each synthesized image (from the image rendering 240 component) and associated metadata (from the landmark projection 245 component) can be stored as a new annotated image in an image dataset 250.

In some embodiments, the static metadata is be propagated through the pipelines 205, 230. In other embodiments, an orchestrator component (not shown) can read the static metadata from the image dataset 201 and write the static metadata along with the synthesized image and associated dynamic metadata to the image dataset 250. Such an orchestrator can perform other operations such as coordinating the processing of each image in the image dataset 201 by the pipelines 205, 230 and writing the resulting synthesized image(s) to the image dataset 250, optionally storing the 3D model and metadata 225 for each source image in a data store, etc. An image dataset including the newly synthesized images and original source images can form a dataset for subsequent training of models (e.g., a dataset stored in a training data store 660 of FIG. 6).

As illustrated in FIG. 2, one or more computer systems 200 implement the model generation pipeline 205 and the image synthesis pipeline 230. Each of the components of the pipelines 205, 230 can be implemented by computer systems 200 as hardware, firmware, software, or some combination thereof. In some embodiments, the computer system(s) 200 are part of a cloud provider network 295. A cloud provider network 295 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. Such services can include data synthesis services, machine learning services, etc.

In some embodiments, an electronic device (not shown) communicates with the cloud provider network 295 via one or more interface(s) 297. Exemplary electronic devices include computing devices such as personal computers, laptops, smart phones, etc. and can be under control by a user. Such electronic devices may be under control of a user. Such interface(s) 297 can include command-line interfaces (CLI), application programing interfaces (API), and/or other programmatic interfaces for the user to submit request to augment a data set, initiate machine learning model training, etc. In some embodiments, the interface(s) 297 permit a user to specify one or more pipeline control parameters 298 that control aspects of the model generation pipeline 205 and/or the image synthesis pipeline 230. Exemplary parameters include the range within to rotate the model about one or more of the axes, the step size for the range, the position and intensity of light sources, etc.

The pipeline architecture illustrated in FIG. 2 are intended to be illustrative. Various components can be combined, or functions of components separated without departing from the scope of the disclosure.

Figure 3:
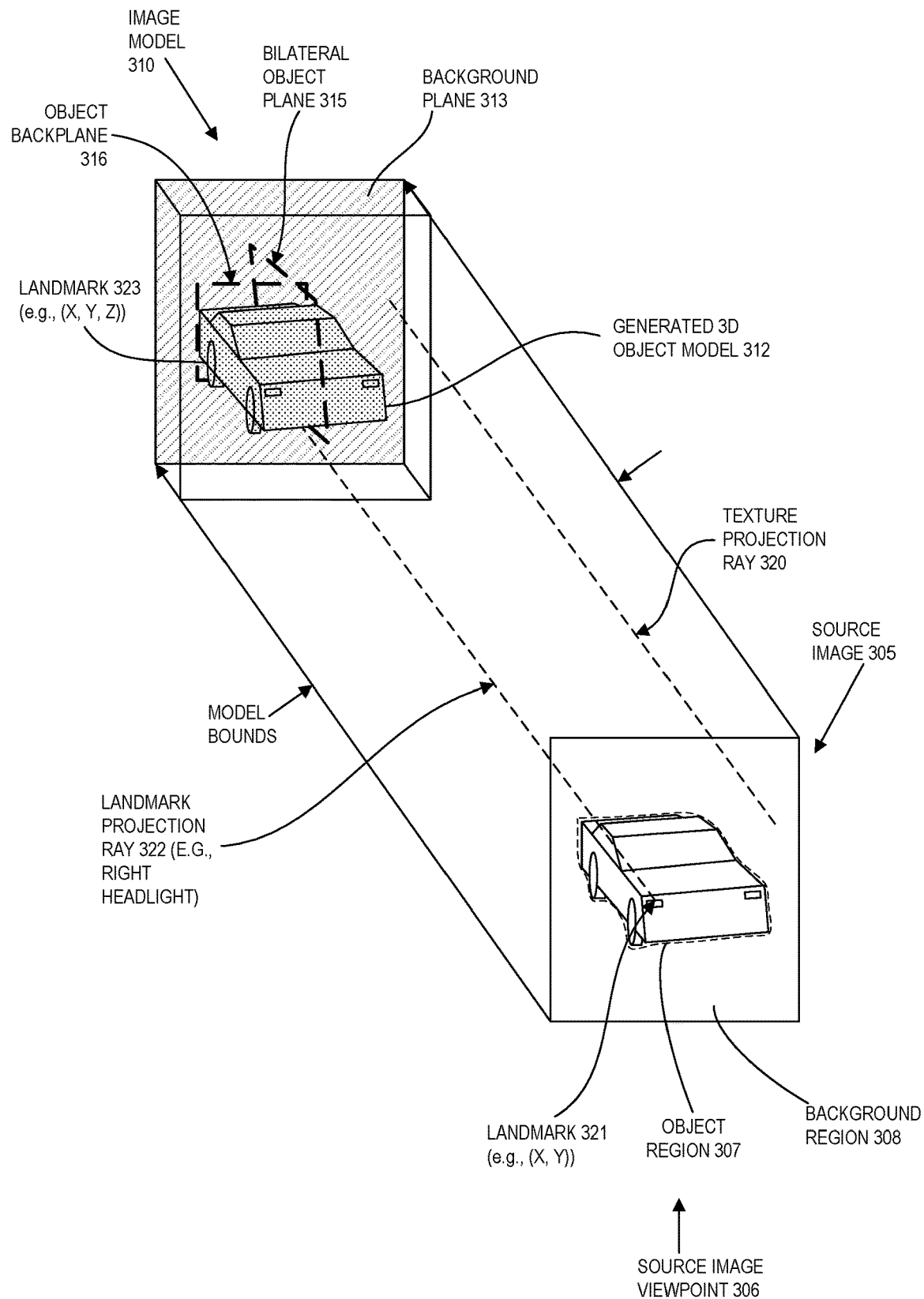
FIG. 3 conceptually illustrates model generation according to some embodiments.

FIG. 3 conceptually illustrates model generation according to some embodiments. In particular, FIG. 3 highlights aspects of the generation of an image model 310 from a source image 305. The image model 310 includes a generated 3D object model 312 and a background plane 313. The source image 305 includes an object region 307 and a background region 308. Regions 307 and 308 can be identified using machine learning models as described above. The object region 307 of the source image 305 is processed, e.g. by the 3D representation generation 210 component as described above, to generate a 3D object model 312.

The 3D object model 312 is aligned to the source image 305 to define the bounds of the image model 310, as indicated.

The 3D object model 312 is used to generate a bilateral object plane 315 and an object backplane 316, e.g., by the orientation estimation 220 component as described above.

The model 310 is textured, e.g., by the texture and label mapping 215 component. For example, ray tracing is used to assign pixel data from the source image 305 to points in the model 310. Rays can be traced through the source image 305 aligned to the image model 310. Rays that intersect with the 3D object model 312 can have the vertex nearest that intersection colored based on the corresponding pixel value in the source image 305, as described above. Rays that do not intersect the 3D object model 312 are part of a background region 308 of the source image and form a background plane 313 of the model. For example, a ray 320 extends from a vertex of the background plane 313 intersecting the source image 305, and the value of the nearest pixel to that intersection is used to color that vertex.

Dynamic labels or landmarks in the metadata associated with the source image 305 are translated into the space of the model 310, e.g., by the texture and label mapping 215 component. For example, ray tracing can be used to convert a landmark 321 corresponding to the right headlight of the vehicle having an (x, y) coordinate in the space of the source image 305 to a corresponding landmark 323 having an (x, y, z) coordinate in the space of the model 310 as indicated by ray 322.

A source image viewpoint 306 can align with the normal to the background plane 313 of the image model 310 (and is often defined as part of the reconstruction process).

Figure 4:
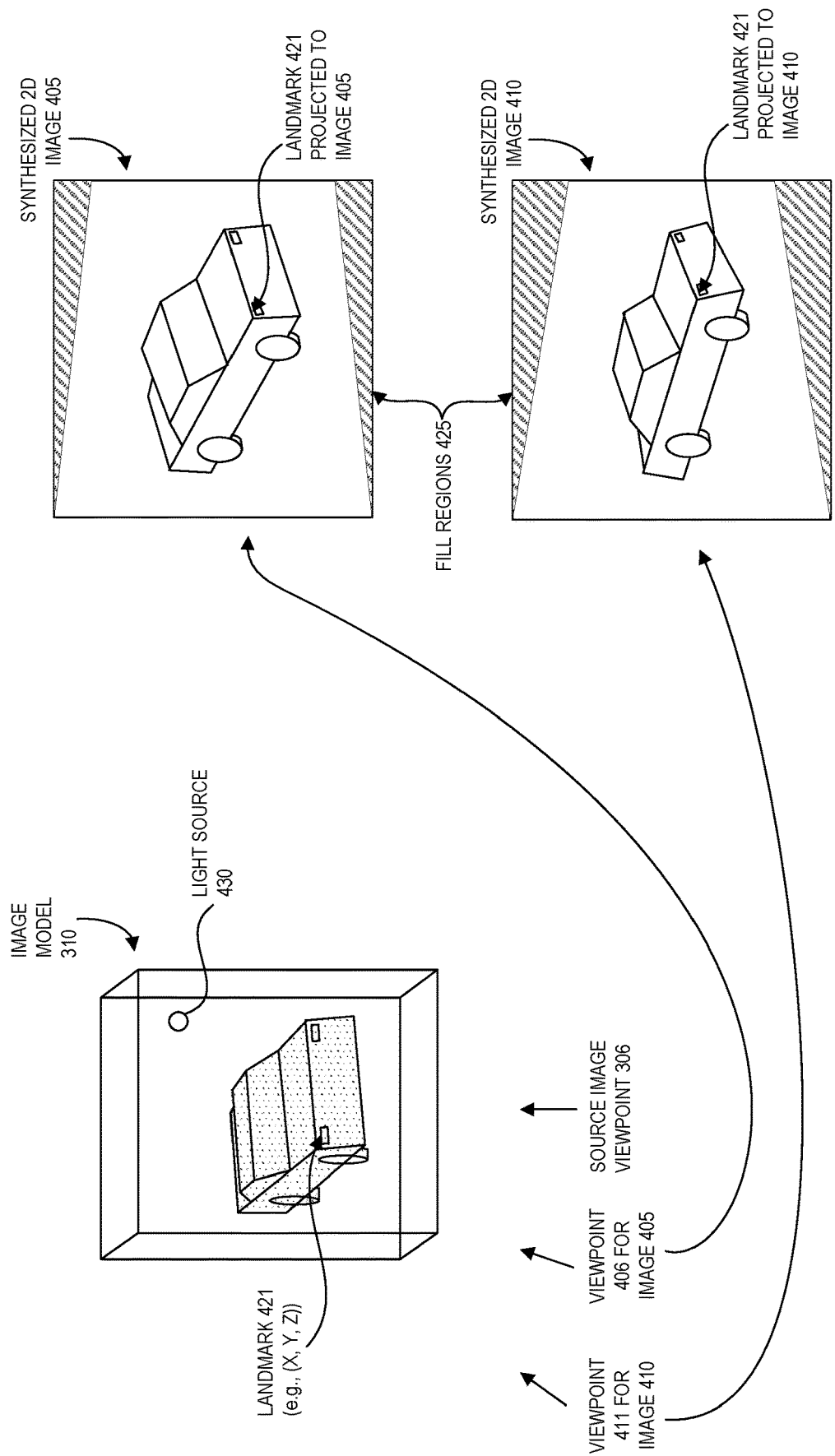
FIG. 4 conceptually illustrates image synthesis according to some embodiments.

FIG. 4 conceptually illustrates image synthesis according to some embodiments. In particular, FIG. 3 highlights aspects of the synthesis of images 405, 410 from the image model 310—e.g., by the image rendering 240 component. As illustrated, new viewpoints 406, 411 having varying degrees of yaw rotation relative to the source image viewpoint 306 are respectively used to synthesize images 405, 410.

Landmarks in the space of the model 310 are also translated to the respective spaces of the synthesized images— e.g., by the landmark projection 245 component. As indicated, a landmark 421 having an (x, y, z) coordinate in the space of the model 310 representing the right headlight of a vehicle is used to derive corresponding landmarks in each of the synthesized images 405, 410 by transforming the (x, y, z) coordinate based on the difference between the source image viewpoint 306 and the respective synthesized image viewpoints 406, 411 (e.g., using trigonometry).

In some embodiments, portions of the synthesized images will not intersect during rendering with the model 310. Such portions may be filled (e.g., with black or white) as indicated by fill regions 425.

In some embodiments, constraints are placed on the permitted viewpoints from which to render synthesized images. Such constraints avoid rendering images based on unknown object data (e.g., portions of the object that were not imaged in the source image). For example, if the front portion of a vehicle is capture in a source image, the constraints limit the rotation so that the unknown, back side of the vehicle is not presented in a viewpoint of one of the synthesized images. As another example, if a human subject in an image is looking to her left, the constraints limit the rotation so that the obscured left portion of her face is not presented in a viewpoint of one of the synthesized images (e.g., the model is not rotated so that she looks to her right). The following equations limit yaw and pitch (while roll can be left unconstrained given it can be handled in two-dimensional space by rotating an image) so that the bilateral symmetry plane is rotated away from the new viewpoint(s).

$$[Q\hat{n}_{bilateral} \times (0,0,1)]_y \geq 0 \text{ (to limit yaw)}$$

$$Q\hat{n}_{backplane} \cdot (0,0,1) \leq 0 \text{ (to limit pitch)}$$

In the above equations, $$Q = \begin{pmatrix} R & t \\ 0^T & 1 \end{pmatrix}$$

is the rigid body transformation representing the change in orientation, R being the various rotations (e.g., pitch, yaw), $\hat{n}_{bilateral}$ is the normal of the bilateral object plane (e.g., the bilateral object plane 315 of FIG. 3) $\hat{n}_{backplane}$ is the normal of the background plane (e.g., the background plane 313), (0,0,1) represents the direction of the viewpoint (e.g., camera is facing in the −z direction), and $[\ ]_y$ is the y-component of the vector in $\mathbb{R}^3$.

As illustrated, a light source 430 has been added to light the image model 310. Such a light source 430 may be arbitrarily located and parameterized to reflect various lighting conditions (e.g., color, intensity, etc.).

Figure 5:
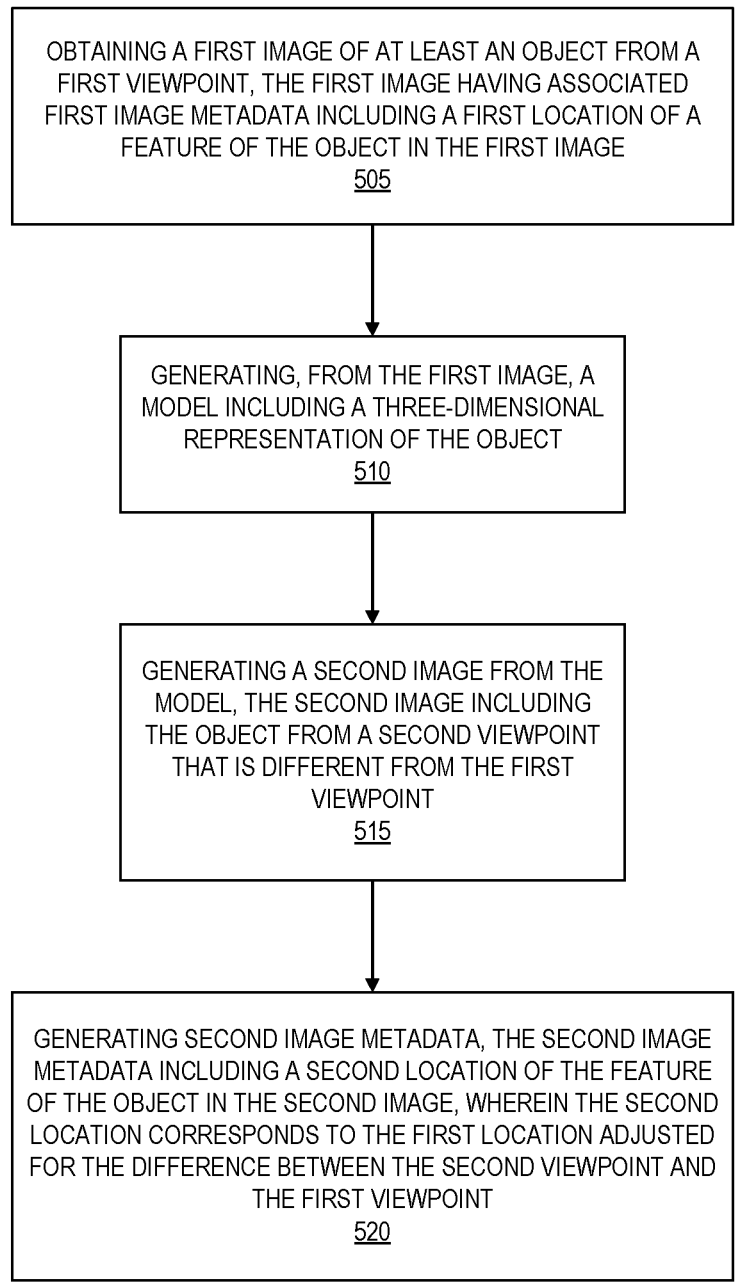
FIG. 5 is a flow diagram illustrating operations of a method for data synthesis using three-dimensional object modeling according to some embodiments.

FIG. 5 is a flow diagram illustrating operations of a method for data synthesis using three-dimensional object modeling according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the data synthesis pipeline (e.g., all or a portion of the model generation pipeline 205 and/or all or a portion of the image synthesis pipeline 230) of the other figures.

The operations include, at block 505, obtaining a first image of at least an object from a first viewpoint, the first image having associated first image metadata including a first location of a feature of the object in the first image. For example, as illustrated in FIG. 2, the model generation pipeline 205 can read or receive image data and associated annotations from the image dataset 201. Such annotations can include static and dynamic annotations, the dynamic annotations locating a feature or landmark of the object within the image (e.g., at a pixel coordinate).

The operations further include, at block 510, generating, from the first image, a model including a three-dimensional representation of the object. For example, the 3D representation generation 210 component can use a 3D reconstruction technique to generate a 3D model of the object, typically from a single image. The reconstruction can be limited to the portion of the image that includes the object of interest (e.g., a vehicle, a face, etc.).

The operations further include, at block 515, generating a second image from the model, the second image including the object from a second viewpoint that is different from the first viewpoint. For example, as illustrated in FIG. 2, the image synthesis pipeline 230 can perform various transformations on a model. Such transformations can include rotations (whether by rotating the model or adjusting the viewpoint of the model). Other transformations include applying different illumination models to adjust light source positions, light source intensities, etc.

The operations further include, at block 520, generating second image metadata, the second image metadata including a second location of the feature of the object in the second image, wherein the second location corresponds to the first location adjusted for the difference between the second viewpoint and the first viewpoint. For example, the texture and label mapping 215 component can translate the dynamic annotations from the source image space to the model space, and the landmark projection 245 component can translate the dynamic annotations from the model space to the new synthesized image space.

In some embodiments, the operations can further include estimating an initial orientation of the object in the first image using a bilateral symmetry plane of the three-dimensional representation. Such an operation can be used to determine which portion of the object appears in the original image and later constrain the view transforms applied during image synthesis (e.g., to avoid rotating the model such that portions of the object not present in the source image are not shown).

In some embodiments, the model can include a background plane along with the 3D representation of the object, and the background plane and 3D representation of the object can be textured (or colored) by applying pixel data from the source image to the model (e.g., via ray tracing).

In some embodiments, the data synthesis can be provided as a service in a cloud provider network. A user can specify various parameters related to the data synthesis (e.g., rotations, step sizes, illumination parameters, etc.) via an API to the service.

Figure 6:
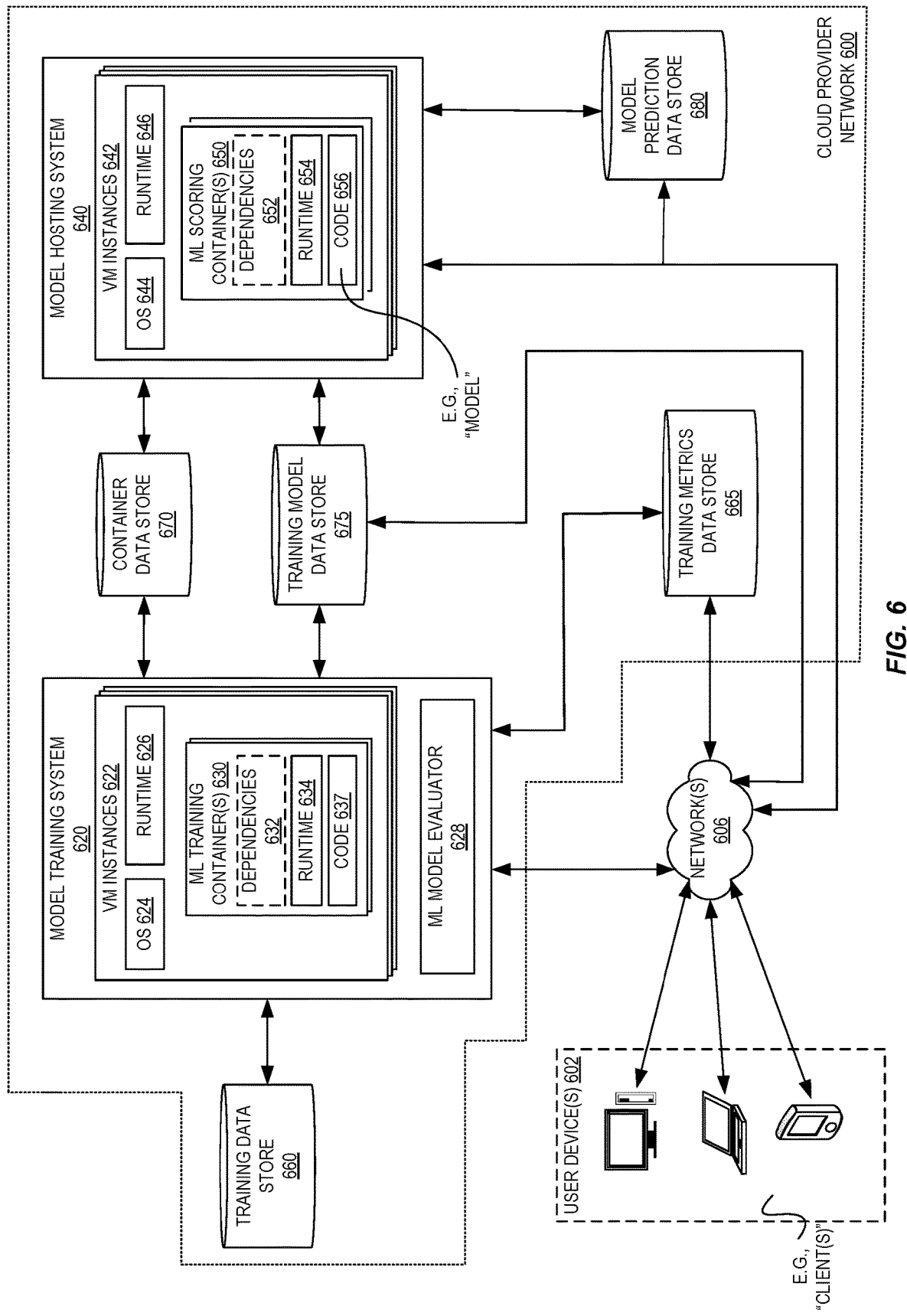
FIG. 6 is a block diagram illustrating an exemplary environment in which machine learning models are trained and hosted according to some embodiments.

FIG. 6 is a block diagram illustrating an exemplary environment in which machine learning models are trained and hosted according to some embodiments. The environment includes end user devices 602 in communication with a cloud provider network 600 via one or more networks 606. The cloud provider network 600 includes a model training system 620, a model hosting system 640, a training data store 660, a training metrics data store 665, a container data store 670, a training model data store 675, and a model prediction data store 680.

The cloud provider network 600 can offer a machine learning service to train and deploy various facial recognition systems for tasks such as face identification (e.g., identifying a face), face recognition (e.g., identifying a specific face), facial landmark localization (e.g., identifying the parts of a face such as eyes, nose, etc.), face attributes detection (e.g., estimating an age or gender), etc. The machine learning service can include one or more of the illustrated cloud provider network 600 entities, such as the model hosting system 640, model training system 620, and so forth.

In some embodiments, users, by way of user devices 602, interact with the model training system 620 to provide data that causes the model training system 620 to train one or more machine learning models, for example, as described elsewhere herein. A machine learning model, generally, may be thought of as one or more equations that are "trained" using a set of data. In some embodiments, the model training system 620 provides ML functionalities as a web service, and thus messaging between user devices 602 and the model training system 620 (or provider network 600), and/or between components of the model training system 620 (or provider network 600), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 602, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 602 may provide, in the training request, an algorithm written in any programming language. The model training system 620 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (for example, an interactive web-based programming environment) and cause the algorithm/code to be provided—perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (for example, an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (for example, containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (for example, task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (for example, creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (for example, the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (for example, execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (for example, a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (for example, coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (for example, the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (for example, information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (for example, information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (for example, known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 602, can transmit a request to the model training system 620 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (for example, rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (for example, containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (for example, task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (for example, creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (for example, supporting software such as libraries) needed by the code 656 in some embodiments. The runtime 654 can be defined by one or more executable instructions that form at least a portion of a container image that is used to form the ML scoring container 650 (for example, the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (for example, predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (for example, an endpoint name, such as an HTTP endpoint name) and an identification of one or more trained machine learning models (for example, a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (for example, formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (for example, a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (for example, a set of input data). The model hosting system 640 or another system (for example, a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (for example, if no more trained machine learning models are needed to generate an output) or transmit the second output to a third ML scoring container 650 initialized in the same or different virtual machine instance 642 (for example, if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (for example, rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multiarmed bandit models, reinforcement learning models, ensemble machine learning models, deep learning models, and/or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (for example, execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 602 via the one or more network(s) 606.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 606 includes any wired network, wireless network, or combination thereof. For example, the network 606 may be a personal area network, local area network, wide area network, over-the-air broadcast network (for example, for radio or television), cable network, satellite network, cellular telephone network, or combination thereof. As a further example, the network 606 may be a publicly accessible network of linked networks, possibly operated by various distinct parties, such as the Internet. In some embodiments, the network 606 may be a private or semi-private network, such as a corporate or university intranet. The network 606 may include one or more wireless networks, such as a Global System for Mobile Communications (GSM) network, a Code Division Multiple Access (CDMA) network, a Long Term Evolution (LTE) network, or any other type of wireless network. The network 606 can use protocols and components for communicating via the Internet or any of the other aforementioned types of networks. For example, the protocols used by the network 606 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
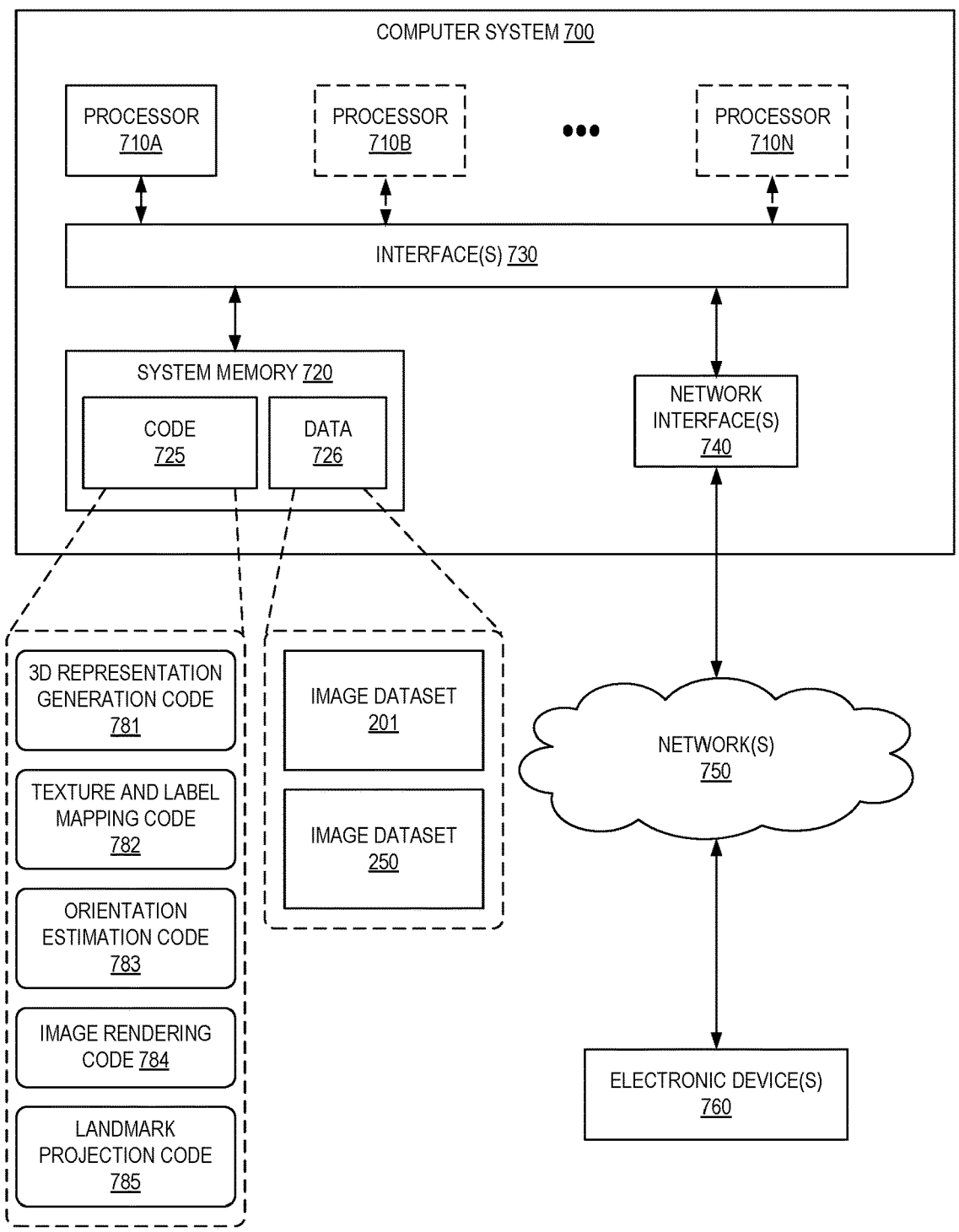
FIG. 7 is a block diagram illustrating an example computer system that may be used in some embodiments.

FIG. 7 is a block diagram illustrating an example computer system that may be used in some embodiments. In some embodiments, a system that implements a portion or all of the techniques described herein may include a general-purpose computer system that includes or is configured to access one or more computer-accessible media, such as computer system 700. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as code 725 and data 726. For example, code 725 can include 3D representation generation code 781 for the 3D representation generation 210 component, texture and label mapping code 782 for the texture and label mapping 215 component, orientation estimation code 783 for the orientation estimation 220 component, image rendering code 784 for the image rendering 240 component, landmark projection code 785 for the landmark projection 245 component, or some combination thereof. Data 726 can include image dataset 201 and/or image dataset 250.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining a first image of at least an object from a first viewpoint, the first image having associated first image metadata including a first location of a feature of the object in the first image;
generating, from the first image, a model including a three-dimensional representation of the object;
generating a second image from the model, the second image including the object from a second viewpoint that is different from the first viewpoint; and
generating second image metadata, the second image metadata including a second location of the feature of the object in the second image, wherein the second location corresponds to the first location adjusted for the difference between the second viewpoint and the first viewpoint.

2. The computer-implemented method of claim 1, wherein an illumination model lights the model for generating the second image, wherein the illumination model includes at least one of a light source position and a light source intensity.

3. The computer-implemented method of claim 2, further comprising estimating an initial orientation of the object in the first image using a bilateral symmetry plane of the three-dimensional representation.

4. The computer-implemented method of claim 3, wherein the bilateral symmetry plane is constrained to rotate away from the first viewpoint in the second viewpoint.

5. The computer-implemented method of claim 1, wherein the model includes a background plane and further comprising applying pixel data from a portion of the first image not including the object to the background plane of the model.

6. The computer-implemented method of claim 5, further comprising applying pixel data from a region including the object in the first image to the three-dimensional representation of the object to texture the three-dimensional representation of the object.

7. The computer-implemented method of claim 5, wherein the second image includes at least a portion of the background plane.

8. The computer-implemented method of claim 1, wherein the second viewpoint is based on a user-specified parameter received via an application programming interface.

9. The computer-implemented method of claim 1, wherein the first image is the only image used to generate the three-dimensional representation.

10. A computer-implemented method comprising:
obtaining a first image and first image metadata, wherein the first image is of at least a portion of a human face from a first viewpoint, the first image metadata including a first location of a feature of the human face in the first image;
generating, from the first image, a model including a three-dimensional representation of the human face;
applying pixel data from the first image to the three-dimensional representation of the human face to generate a textured three-dimensional representation of the human face;
generating a second image using the textured three-dimensional representation of the human face, the second image including the human face from a second viewpoint that is different than the first viewpoint;
generating second image metadata, the second image metadata including a second location of the feature of the human face in the second image, wherein the second location corresponds to the first location adjusted for the difference between the second viewpoint and the first viewpoint; and
storing the second image and second image metadata in an image dataset.

11. The computer-implemented method of claim 10, wherein the model includes a background plane that includes a background of the first image and wherein the second image includes a background based at least in part on the background plane.

12. The computer-implemented method of claim 10, further comprising estimating an initial orientation of the human face in the first image using a bilateral symmetry plane of the three-dimensional representation, and wherein the bilateral symmetry plane is rotated away from the first viewpoint in the second viewpoint.

13. A system comprising:
a data store implemented by a first one or more electronic devices; and
a data synthesis service implemented by a second one or more electronic devices, the data synthesis service including instructions that upon execution cause the data synthesis service to:
obtain a first image from the data store, the first image of at least an object from a first viewpoint, the first image having associated first image metadata including a first location of a feature of the object in the first image;
generate, from the first image, a model including a three-dimensional representation of the object;
generate a second image from the model, the second image including the object from a second viewpoint that is different from the first viewpoint;
generate second image metadata, the second image metadata including a second location of the feature of the object in the second image, wherein the second location corresponds to the first location adjusted for the difference between the second viewpoint and the first viewpoint; and
store the second image and the second image metadata in the data store.

14. The system of claim 13, wherein an illumination model lights the model for generating the second image, wherein the illumination model includes at least one of a light source position and a light source intensity.

15. The system of claim 13, further comprising estimating an initial orientation of the object in the first image using a bilateral symmetry plane of the three-dimensional representation.

16. The system of claim 15, wherein the bilateral symmetry plane is constrained to rotate away from the first viewpoint in the second viewpoint.

17. The system of claim 13, wherein the model includes a background plane and further comprising applying pixel data from a portion of the first image not including the object to the background plane of the model.

18. The system of claim 17, wherein the data synthesis service includes further instructions that upon execution cause the data synthesis service to apply pixel data from a region including the object in the first image to the three-dimensional representation of the object to texture the three-dimensional representation of the object.

19. The system of claim 17, wherein the second image includes at least a portion of the background plane.

20. The system of claim 13, further comprising:

a machine learning service implemented by a third one or more electronic devices, the machine learning service including instructions that upon execution cause the machine learning service to train a machine learning model using an image dataset, the image dataset including the first image, the second image, the first image metadata, and the second image metadata.

* * * * *